US009505315B2

(12) United States Patent
Garcia Briz et al.

(10) Patent No.: US 9,505,315 B2
(45) Date of Patent: Nov. 29, 2016

(54) WIRELESS CHARGING BASED ON SELECTIVE ACTIVATION OF TRANSMIT ANTENNAS

(71) Applicant: QUALCOMM Incorporated, San Diego, CA (US)

(72) Inventors: Alberto Garcia Briz, Munich (DE); Grzegorz Ombach, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 14/450,933

(22) Filed: Aug. 4, 2014

(65) Prior Publication Data
US 2016/0031332 A1 Feb. 4, 2016

(51) Int. Cl.
H02J 7/00 (2006.01)
B60L 11/18 (2006.01)
G01V 3/10 (2006.01)
H02J 7/02 (2016.01)

(52) U.S. Cl.
CPC ............... *B60L 11/182* (2013.01); *G01V 3/10* (2013.01); *H02J 7/007* (2013.01); *H02J 50/40* (2016.02); *H02J 50/60* (2016.02); *H02J 7/025* (2013.01); *Y02T 90/122* (2013.01); *Y02T 90/162* (2013.01)

(58) Field of Classification Search
CPC ..... Y02T 90/122; Y02T 90/162; H02J 7/025
USPC .................................................. 320/107–109
See application file for complete search history.

(56) References Cited

U.S. PATENT DOCUMENTS

| | | | | |
|---|---|---|---|---|
| 5,573,090 A * | 11/1996 | Ross | ........................ | B60L 5/005 180/2.1 |
| 5,669,470 A * | 9/1997 | Ross | ........................ | B60L 5/005 191/10 |
| 9,214,987 B2 * | 12/2015 | Yang | .................... | H04B 5/0081 |
| 2007/0145830 A1 | 6/2007 | Lee et al. | | |
| 2012/0187757 A1 | 7/2012 | Wechlin et al. | | |
| 2013/0169062 A1 | 7/2013 | Maikawa et al. | | |
| 2013/0181724 A1 | 7/2013 | Teggatz et al. | | |
| 2013/0257357 A1* | 10/2013 | Morinaga | ............. | H02J 7/0004 320/107 |
| 2014/0015522 A1 | 1/2014 | Widmer et al. | | |
| 2014/0021912 A1* | 1/2014 | Martin | ................ | B60L 11/1833 320/109 |
| 2014/0084857 A1* | 3/2014 | Liu | ......................... | H02J 7/025 320/108 |
| 2014/0203768 A1* | 7/2014 | Andic | ....................... | H02J 7/00 320/108 |
| 2014/0239891 A1* | 8/2014 | Martin | .................. | B60L 11/182 320/108 |
| 2014/0347008 A1* | 11/2014 | Chae | ....................... | H02J 5/005 320/108 |
| 2015/0355360 A1* | 12/2015 | Miyashita | ............... | H02J 7/025 320/108 |
| 2016/0020642 A1* | 1/2016 | Liu | ......................... | H02J 7/025 320/108 |
| 2016/0028266 A1* | 1/2016 | Madau | ................... | H02J 7/025 320/108 |

* cited by examiner

*Primary Examiner* — Stacy Whitmore
(74) *Attorney, Agent, or Firm* — Knobbe Martens Olson & Bear LLP

(57) ABSTRACT

A wireless power transfer system for selectively disabling a transmit antenna of a plurality of transmit antennas when a foreign object is detected is described. The system comprises a first transmit antenna configured to charge an electric vehicle positioned over a charging region via a first area of the charging region and also comprises a second transmit antenna configured to charge via a second area of the charging region. The system further comprises a controller circuit configured to selectively disable the first transmit antenna when a foreign object is detected in a first space that affects charging via the first area of the charging region. The controller circuit is further configured to selectively maintain activation of the second transmit antenna while the electric vehicle is positioned to receive power from the second transmit antenna via the second area when the foreign object is detected in the first space.

25 Claims, 10 Drawing Sheets

WIRELESS CHARGING BASED ON SELECTIVE ACTIVATION OF TRANSMIT ANTENNAS

FIELD

This disclosure generally relates to wireless power. More specifically, the disclosure is directed to devices, systems, and methods related to foreign object detection in modular wireless power transfer systems.

BACKGROUND

Wireless power transfer systems may differ in many aspects including circuit topologies, magnetics layout, and power transmission capabilities or requirements. The amount of power transferred between components of a wireless power transfer system may be affected by foreign objects in the vicinity of a transmitter pad, further leading to safety concerns regarding the heating of such foreign objects. Thus, there is a need in the art to improve detection of presence of foreign objects between the transmitter pad and an electric vehicle.

SUMMARY

A wireless power transfer system is provided. The wireless power transfer system comprises a first transmit antenna configured to charge an electric vehicle positioned over a charging region. The first transmit antenna is configured to charge the electric vehicle via a first area of the charging region. The wireless power transfer system further comprises a second transmit antenna configured to charge the electric vehicle positioned over the charging region. The second transmit antenna is configured to charge the electric vehicle via a second area of the charging region different than the first area of the charging region. The wireless power transfer system further comprises a controller circuit coupled to the first transmit antenna and the second transmit antenna. The controller circuit is configured to selectively disable the first transmit antenna when a foreign object is detected in a first space that affects charging via the first area of the charging region. The controller circuit is further configured to selectively maintain activation of the second transmit antenna while the electric vehicle is positioned to receive power from the second transmit antenna via the second area when the foreign object is detected in the first space.

A method of wireless power transfer is also provided. The method comprises charging an electric vehicle positioned over a charging region via a first area of the charging region. The method further comprises charging the electric vehicle positioned over the charging region via a second area of the charging region that is different than the first area. The method further comprises disabling the charging via the first area when a foreign object is detected in a first space that affects the charging via the first area. The method further comprises maintaining the charging via the second area while the electric vehicle is positioned over the second area when the foreign object is detected in the first space.

An apparatus for wirelessly transferring power is also provided. The apparatus comprises first means for charging an electric vehicle positioned over a charging region via a first area of the charging region. The apparatus further comprises second means for charging the electric vehicle via a second area of the charging region different than the first area of the charging region. The apparatus further comprises means for disabling the first means when a foreign object is detected in a first space that affect the charging via the first area. The apparatus further comprises means for maintaining activation of the second means while the electric vehicle is positioned to receive power from the second means when the foreign object is detected in the first space.

A non-transitory computer-readable medium storing instructions that, when executed causes at least one physical computer processor to perform a method of wireless power transfer is provided. The method comprises charging an electric vehicle positioned over a charging region via a first area of the charging region. The method further comprises charging the electric vehicle positioned over the charging region via a second area of the charging region that is different than the first area. The method further comprises disabling the charging via the first area when a foreign object is detected in a first space that affects the charging via the first area. The method further comprises maintaining the charging via the second area while the electric vehicle is positioned over the second area when the foreign object is detected in the first space.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled (such as being operationally coupled) by a "receive antenna" to achieve power transfer.

Figure 1:
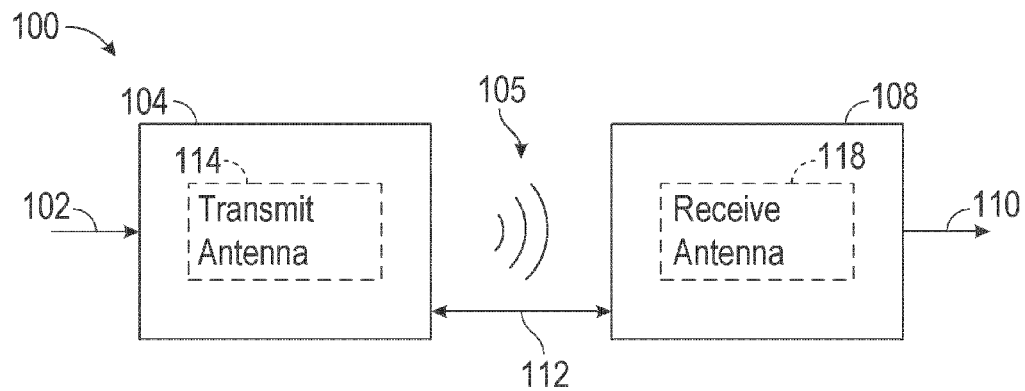
FIG. 1 is a functional block diagram of a wireless power transfer system, in accordance with one exemplary implementation.

FIG. 1 is a functional block diagram of a wireless power transfer system 100, in accordance with one exemplary implementation. An input power 102 may be provided to a transmitter 104 from a power source, such as a transmit circuit (not shown in this figure), to generate a wireless (e.g., magnetic or electromagnetic) field 105 for performing power transfer.

A receiver 108 is configured to couple to the wireless field 105 and generate an output power 110 for storing or consumption by a load (not shown in this figure) coupled to the output power 110. The receiver 108 may receive power via the receive antenna 118 (e.g., a coil) when the receiver 108 is located in the wireless field 105 produced by the transmitter 104. The wireless field 105 corresponds to a region where energy output by the transmitter 104 may be captured by the receiver 108. The wireless field 105 may correspond to the "near field" of the transmitter 104 as will be further described below. The transmitter 104 may comprise a transmit antenna 114 (e.g., a coil) for transmitting energy to the receiver 108. The receiver 108 may comprise a receive antenna 118 for receiving or capturing energy transmitted from the transmitter 104. The near-field may correspond to a region in which there are strong reactive fields resulting from the currents and charges in the transmit antenna 114 that minimally radiate power away from the transmit antenna 114. The near-field may correspond to a region that is within about one wavelength (or a fraction thereof) of the transmit antenna 114. Both the transmitter 104 and the receiver 108 are separated by a distance 112.

In one exemplary implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may require large antenna antennas which are very close (e.g., sometimes within millimeters). Resonant inductive coupling techniques may thus allow for improved efficiency and power transfer over various distances and with a variety of inductive antenna configurations.

As described above, efficient energy transfer may occur by coupling a large portion of the energy in the wireless field 105 to the receive antenna 118 rather than propagating most of the energy in an electromagnetic wave to the far field. When positioned within the wireless field 105, a "coupling mode" may be developed between the transmit antenna 114 and the receive antenna 118. The area around the transmit antenna 114 and the receive antenna 118 where this coupling may occur is referred to herein as a coupling mode region.

Figure 2:
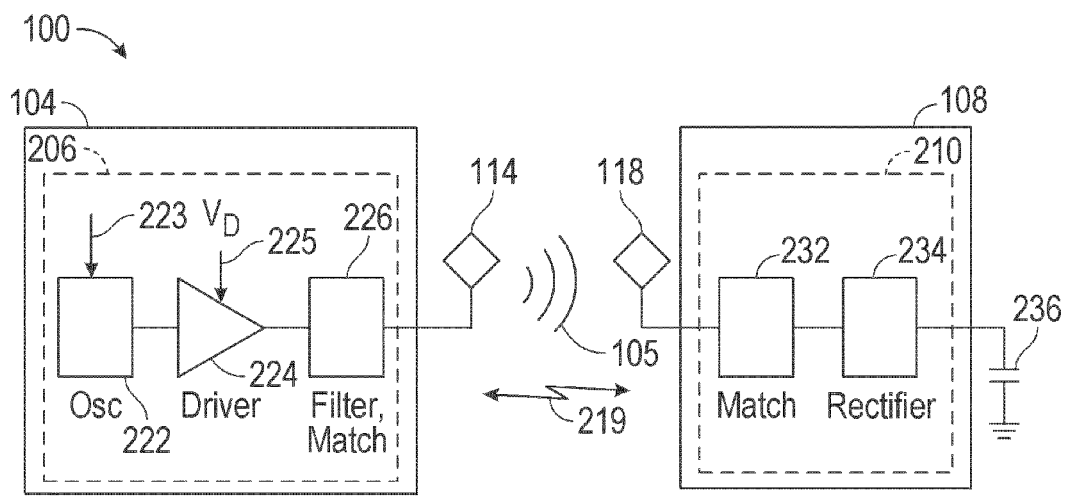
FIG. 2 is a functional block diagram of the wireless power transfer system of FIG. 1 with a transmit circuitry and a receive circuitry, in accordance with another exemplary implementation.

FIG. 2 is a functional block diagram of the wireless power transfer system 100 of FIG. 1 with a transmit circuitry 206 and a receive circuitry 210, in accordance with another exemplary implementation. As described in connection to FIG. 1, the system 100 comprises the transmitter 104 and the receiver 108. As illustrated in the embodiment of FIG. 2, the transmitter 104 may comprise the transmit circuitry 206. The transmit circuitry 206 may comprise an oscillator 222. The oscillator 222 is configured to generate an oscillated signal at a desired frequency that may be adjusted in response to a frequency control signal 223.

The transmit circuitry 206 may comprise a driver circuit 224 coupled to the output of the oscillator 222. The driver circuit 224 is configured to receive the oscillated signal from the oscillator 222 and output a driven signal.

The transmit circuitry 206 may comprise a filter and matching circuit 226 coupled to the output of the driver circuit 224. The filter and matching circuit 226 is configured to receive the driven signal from the driver circuit 224. The filter and matching circuit 226 is configured to filter out harmonics or other unwanted frequencies from the driving signal to match the impedance of the transmitter 104 to the transmit antenna 114 and generate a filtered signal.

As described in connection to FIG. 1, the transmitter 104 may comprise the transmit antenna 114. As illustrated in the embodiment of FIG. 2, the transmit antenna 114 may be coupled to the output of the filter and matching circuit 226 and be configured to receive the filtered signal from the filter and matching circuit 226. The transmit antenna 114 is configured to generate the wireless field 105 to wirelessly output power at a level sufficient for charging a load.

As described in connection to FIG. 1, the receiver 108 may comprise the receive antenna 118. As illustrated in the embodiment of FIG. 2, the receive antenna 118 is configured to receive the wireless field 105 generated by transmit antenna 114. The transmit antenna 118 is configured to convert the power from the wireless field 105 into power that may be processed by the receive circuitry 210.

The receiver 108 may comprise the receive circuitry 210. The receive circuitry is coupled to the output of the receive antenna 118. The receive circuitry 210 may comprise a matching circuit 232 coupled to the output of the receive antenna 118. The matching circuit 232 may receive power output from the receive antenna 118 and match the impedance of the receive circuitry 210 to the receive antenna 118.

The receive circuitry 210 may comprise a rectifier circuit 234. The rectifier circuit 234 is coupled to the output of the matching circuit 232. The rectifier circuit 234 is configured to receive the output of the matching circuit 232. The rectifier circuit 234 is configured to generate a direct current (DC) power signal output from an alternate current (AC) power input.

The wireless transfer system 100 may comprise an electric vehicle battery 236. The electric vehicle battery 236 may be coupled to the output of the rectifier circuit 234 and is configured to receive the direct current (DC) power signal output from the rectifier circuit 234.

Figure 3:
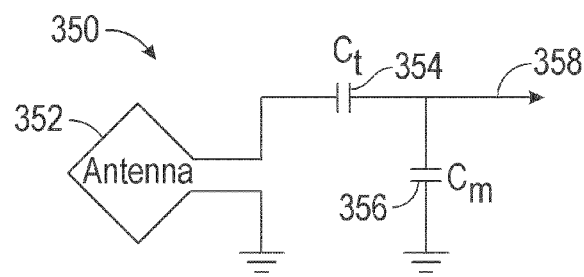
FIG. 3 is a schematic diagram of a portion of the transmit circuitry or the receive circuitry of FIG. 2 including the transmit antenna or the receive antenna, in accordance with an exemplary implementation.

FIG. 3 is a schematic diagram of a portion of the transmit circuitry 206 or the receive circuitry 210 of FIG. 2 including the transmit antenna 114 or the receive antenna 118, in accordance with an exemplary implementation. As illustrated in the embodiment of FIG. 3, the transmitter 114 or the receiver may comprise an antenna 352. The antenna 352 may also be referred to or be configured as a "loop" antenna 352. The antenna 352 may also be referred to herein or be configured as a "magnetic" antenna or an "induction" antenna. The term "antenna" generally refers to a component that may wirelessly output or receive energy for coupling to another "antenna." The antenna may also be referred to as a type of antenna that is configured to wirelessly output or receive power. In some embodiments, the antenna may be configured as a coil with one or more windings. As used herein, the antenna 352 is an example of a "power transfer component" of a type that is configured to wirelessly output and/or receive power.

The antenna 352 may comprise an air core or a physical core such as a ferrite core (not shown in this figure). The antenna 352 with an air core may be more tolerable to extraneous physical devices placed in the vicinity of the core. Furthermore, the antenna 352 with an air core may allow the placement of other components within the core area. In addition, the antenna 352 with an air core may more readily enable placement of the receive antenna 118 within a plane of the transmit antenna 114 where the coupled mode region of the transmit antenna 114 may be more powerful.

As stated, efficient transfer of energy between the transmitter 104 and the receiver 108 may occur during matched or nearly matched resonance between the transmitter 104 and the receiver 108. However, even when resonance between the transmitter 104 and the receiver 108 are not matched, energy may be transferred, although the efficiency may be affected. For example, the efficiency may be less when resonance is not matched. Transfer of energy occurs by coupling energy from the wireless field 105 to the receive antenna 118 rather than propagating the energy from the transmit antenna 114 into free space.

The resonant frequency of the antenna may be based on inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmitter 104 or the receiver 108 to create a resonant circuit that selects a signal 358 at a resonant frequency. Accordingly, for larger diameter antennas, the size of capacitance needed to sustain resonance may decrease as the diameter or inductance of the loop increases.

Referring to FIGS. 1 and 2, the transmitter 104 may output a time varying magnetic (or electromagnetic) field with a frequency corresponding to the resonant frequency of the transmit antenna 114. When the receiver 108 is within the wireless field 105, the time varying magnetic (or electromagnetic) field may induce a current in the receive antenna 118. As described above, if the receive antenna 118 is configured to resonate at the frequency of the transmit antenna 114, energy may be efficiently transferred. The AC signal induced in the receive antenna 118 may be rectified as described above to produce a DC signal that may be provided to charge or to power a load.

Figure 4:
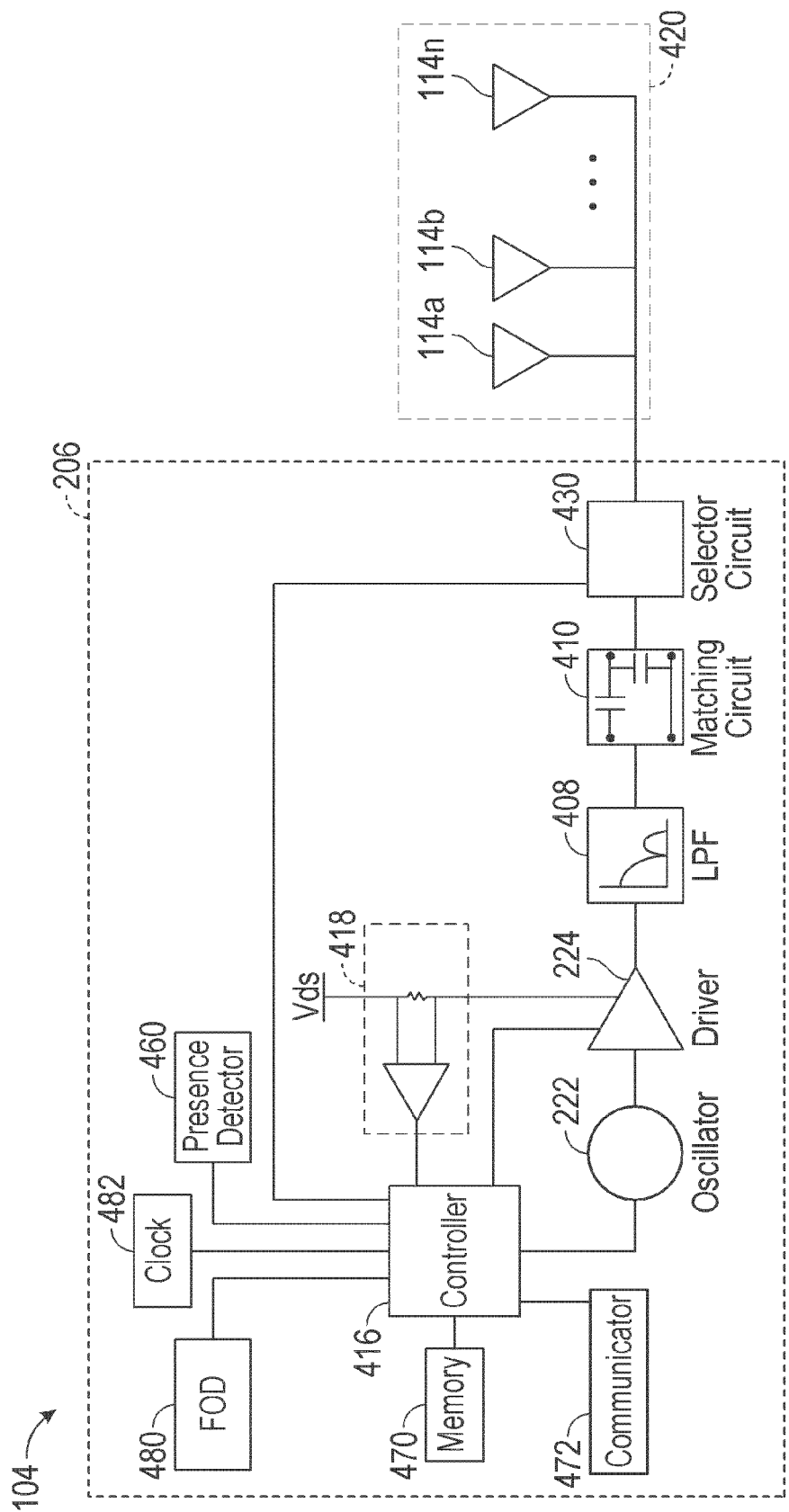
FIG. 4 is a functional block diagram of the transmitter that may be used in the wireless power transfer system of FIG. 1, in accordance with another exemplary implementation.

FIG. 4 is a functional block diagram of the transmitter 104 that may be used in the wireless power transfer system 100 of FIG. 1, in accordance with another exemplary implementation. As described in connection to FIG. 2, the transmitter 104 may comprise the transmit circuitry 206. The transmit circuitry 206 may comprise the oscillator 222. The transmit circuitry 206 may comprise the driver circuit 224.

As shown in in the embodiment of FIG. 4, the transmit circuitry 206 may comprise a low pass filter (LPF) 408 coupled to the output of the driver circuit 224. The low pass filter 408 is configured to receive the driven signal from the driver circuit 224. The low pass filter 408 is configured to reduce harmonic emissions of the driver circuit 224 to levels that prevent self-jamming of the receiver 108 (of FIG. 2) to output a low pass filtered signal.

The transmit circuitry 206 may comprise a matching circuit 410 coupled to output of the low pass filter 408. The matching circuit 410 is configured to receive the low pass filtered signal from the low pass filter 408. The matching circuit 410 is configured to match the impedance of the transmit circuitry 206 to least one transmit antenna 114a, 114b . . . 114n (e.g., a coil), where "n" designates an arbitrary or predetermined number of transmit antennas 114a, 114b . . . 114n, collectively hereinafter "114".

The transmit circuitry 206 may comprise a selector circuit 430 coupled to the output of the matching circuit 410. The selector circuit 430 is configured as a switch to receive the output of the matching circuit 410. The selector circuit 430 is configured to selectively activate or disable one or more transmit antennas 114 by receiving instruction signals from a controller circuit 416 as will be described in greater detail below. By activating a transmit antenna 114, the selector circuit 430 is configured to connect the transmit circuitry 206 to the activated transmit antenna 114 and allow the output of the matching circuit 410 to pass to the activated transmit antenna 114. By disabling a transmit antenna 114, the selector circuit 430 is configured to not allow (e.g., block) the output of the matching circuit to pass to the disabled transmit antenna 114 by disconnecting the disabled transmit antenna 114 from the transmit circuitry 206. In certain embodiments, less power is transmitted from the transmit antennas 114 to the receiver 108 when one or more transmit antennas 114 are disabled relative to when no transmit antenna 114 is disabled. Advantageously, safer operation of the wireless power transfer system 100 may be achieved with less power transmitted from the transmit antennas 114 when one or more transmit antennas 114 are disabled. In particular embodiments, a same amount of power is transmitted from the transmit antennas 114 to the receiver 108 when one or more transmit antennas 114 are disabled relative to when no transmit antenna 114 is disabled. Advantageously, transfer of a nominal amount of power to charge or to power a load can be maintained when a same amount of power is transmitted when one or more transmit antennas 114 is disabled as when no transmit antenna is disabled. Accordingly, power from the driven signal can be selectively transmitted or not transmitted by the transmit antennas 114.

The transmitter 104 may comprise a transmitter pad 420. The transmitter pad 420 may comprise at least one transmit antenna 114a, 114b . . . 114n. The transmit antennas 114 may be coupled to the output of the selector circuit. 430. The transmitter pad 420 is configured to receive the output of the selector circuit 430 and pass the output of the selector circuit 430 to the transmit antennas 114. The transmitter pad 420 is configured to generate an electromagnetic or magnetic field in a region, hereinafter referred to as a "charging region." Also, each transmit antenna 114 of the transmitter pad 420 is configured to generate an electromagnetic or magnetic field in an area of the charging region, hereinafter referred to as a "charging area." The transmit antennas 114 are configured to transmit power to the receiver 108 within the charging area of the transmit antennas 114. In an exemplary embodiment, the transmit antennas 114 may receive an acknowledgement from the receiver 108 regarding the amount of power the receiver 108 has received. The transmit antennas 114 may also receive information from the receiver 108 about the various specifications of the receiver 108, as described below. Although only three transmit antennas 114a, 114b, 114n are specifically illustrated, as will be described further below, the transmitter 104 may comprise any number (one or greater) of transmit antennas (as indicated with "114n") in accordance with different embodiments.

The transmit circuitry 206 may comprise the controller circuit 416 coupled to the selector circuit 430, the oscillator 222 and the driver circuit 224. The controller circuit 416 is configured to control various components of the transmit circuitry 206, including the selector circuit 430, the oscillator 222 and the driver circuit 224.

The transmit circuitry 206 may comprise a memory 470. The memory may be coupled to the controller circuit 416. The memory 470 is configured to communicate with the controller circuit 416. The controller circuit 416 is configured to control the memory 470. The memory 470 is configured to temporarily or permanently store data for use in the determinations of the controller circuit 416. The memory 470 may also store various specifications of the components of the transmitter 104 and/or the receiver 108 for use in determinations as described below.

The transmit circuitry 206 may comprise a presence detector circuit 460. The presence detector circuit 460 may be coupled to the controller circuit 416. The presence detector circuit 460 is configured to communicate with the controller circuit 416. The controller circuit 416 is configured to control the presence detector circuit 460. The presence detector circuit 460 is configured to detect the presence of the receive antenna 118 within the charging area of at least one transmit antenna 114. In certain embodiments, the presence detector circuit 460 may be a motion sensor configured to detect the receive antenna 118. The motion sensor may be (but is not limited to) a ultrasonic sensor, microwave sensor or tomographic motion sensor. In some embodiments, the presence detector 460 may be configured to detect the presence of a living being, such as a human, and selectively trigger adjustment of the power based on the presence of the living being.

The transmit circuitry 206 may comprise a load sensing circuit 418 coupled to the controller circuit 416 and the driver 224. The load sensing circuit 418 is configured to communicate with the controller circuit 416. The controller circuit 416 is configured to control the load sensing circuit 418. The load sensing circuit 418 is configured to monitor the current flowing to the driver circuit 224.

The transmit circuitry 206 may comprise a clock 482. The clock 482 is coupled to the controller circuit 416 and configured to communicate with the controller circuit 416. The controller circuit 416 is configured to control the clock 482. The clock 482 is configured to generate a clock signal which enables the controller circuit 416 to synchronize actions performed by the transmit circuitry 206. In one embodiment, the controller circuit 416 may use the clock signal to maintain clock synchronization between the transmitter 104 and the receiver 108.

The transmit circuitry 206 may comprise the foreign object detector circuit 480. The foreign object detector circuit 480 is coupled to the controller circuit 416. The foreign object detector circuit 480 is configured to communicate with the controller circuit 416. The controller circuit 416 is configured to control the foreign object detector circuit 480. In some embodiments, the foreign object detector circuit 480 may comprise one or more sensors configured to detect a foreign object. Each of the one or more sensors configured to detect a foreign object may be configured to detect the foreign object in different charging areas associated with different transmit antennas. The foreign object may include an object that is not a part of the power transfer system such as any metal object, coins, jewelry, eye-glasses, key-chains, and the like. In one embodiment, the foreign object may be any object or device that is unable to communicate with the transmit pad 420 and function with the system control which allows the transmit pad 420 no method to regulate or detect the electrical energy consumed by the foreign object. Since the transmit pad 420 may create a magnetic field, electrical energy may be transferred to any device or object that couples to the transmitter magnetic field. In this way, the foreign object may affect the consumption of power transmitted by the transmit pad 420 and/or affect the charging region when it is within, near, or around the charging area(s) of the charging region. The energy absorbed may be dissipated as heat, which may damage the foreign object, harm or burn a user, cause a fire, damage the transmitter, or create any other safety issue. The foreign object detector circuit 480 may be configured to detect one or more foreign objects as just described.

For example, in accordance with an embodiment, the foreign object detector circuit 480 may include one or more sense coils configured to detect one or more changes in a field generated by the sense coils caused by the foreign object such as a metal object. The sense coils may be provided over the surface of the transmitter antennas 114 in some embodiments to detect objects anywhere within the charging areas of each of the transmitter antennas 114. As another example, the foreign object detector circuit 480 may include sensors such as the type of sensors described above with reference to the presence detector 460 to detect a presence of a foreign object.

As another example, in some embodiments the foreign object detector circuit 480 may be configured to take power measurements from particular transmit antennas 114 at a sample time during each sample period and compare the power measurements to detect a foreign object. For example, the foreign object detector circuit 480 may take this power measurement at a first sample time. The foreign object detector circuit 480 may then take a second power measurement at a second sample time and determine a power difference between the power measurements at each sample time. In one embodiment, if the power difference at the transmitter 104 exceeds a predetermined threshold, then the foreign object detector circuit 480 may compare the power difference with a power difference independently generated by the receiver 108.

Based on the results of the above comparison (e.g., if the difference of the receiver power differences is greater than the difference of the transmitter power differences multiplied by a proportional factor value, k), in one embodiment, the foreign object detector circuit 480 may determine that the foreign object is present within a charging area of a particular transmit antenna 114. In another embodiment, rather than immediately determining the presence of the foreign object, the foreign object detector circuit 480 may first identify other possible contributors to the power inequalities. By identifying other possible contributors to the power inequalities, the foreign object detector circuit 480 may avoid making a false determination that the foreign object is present. For example, one possible contributor to the power inequalities may be a change in the acknowledged power at the receiver 108 coupled with a lack of synchronization (e.g., a time misalignment) between measurements taken at the transmitter 104 and the receiver 108. In one embodiment, the lack of synchronization between measurements may occur due to the clock 482 being out-of-sync with a clock of the receiver 108. In another embodiment, the measurements at the transmitter 104 and the receiver 108 may be out-of-sync for a different reason, and the foreign object detector circuit 480 may use another method to align the measurement sample times (e.g., account for a difference of synchronization between the transmitter 104 sample times and the receiver 108 sample times).

As described above, the transmit circuitry 206 may comprise the selector circuit 430. The selector circuit 430 is configured to communicate with the controller circuit 416. The controller circuit 416 is configured to control the selector circuit 430 by sending control signals to the selector circuit 430. Based on the controller circuit's 416 control signals, the selector circuit 430 is configured to send information to the transmitter pad 420 in order to selectively activate or disable a particular transmit antenna 114. Based on the controller circuit's 416 control signals, the selector circuit 430 is configured to selectively activate or disable a particular transmit antenna 114 when the foreign object detector circuit 480 detects the foreign object within the charging area of a particular transmit antenna 114a. For example, the selector circuit 430 may selectively disable the transmit antenna 114a when the foreign object is detected by the foreign object detector circuit 480 within the charging area of the transmit antenna 114a while leaving the other transmit antennas 114b, 114n activated and/or activating the other transmit antennas 114b, 114n. Based on the controller circuit's 416 control signals, the selector circuit 430 may also be configured to selectively activate or disable a particular transmit antenna 114 when the presence detector circuit 460 detects the receive antenna 118 within the charging area of the particular transmit antenna 114. For example, the selector circuit 430 may selectively activate the transmit antenna 114a when the presence detector circuit detects the receive antenna 118 within the charging area of the transmit antenna 114a and disable the transmit antenna 114a when the presence detector circuit does not detect the receive antenna 118 within the charging area of the transmit antenna 114a. Thereby, by selectively activating and/or disabling a particular transmit antenna 114, the transmitter can more efficiently utilize the charging antennas 114 to be activated when useful and be disabled when not useful or to avoid damage to the wireless power transfer system 100 due to the presence of the foreign object within the charging area of the transmit antennas 114.

The transmit circuitry 206 may comprise a communicator circuit 472. The communicator circuit 472 may be coupled to the controller circuit 416. The controller circuit 416 is configured to control the communicator circuit 472. The communicator circuit 472 is configured to pass information to and from the controller circuit 416. The communicator circuit 472 is configured to enable the controller circuit 416 to communicate with the receiver 108 by establishing a communication link with the receiver 108 (FIG. 2). The communication link may be made with any communication protocol. Further discussion of the communication link is provided in connection to FIG. 5.

Although FIG. 4 shows many different components in functional block forms, an actual physical embodiment may combine one or more functional blocks in a single, unitary component. For example, the clock 482 or the foreign object detector circuit 480 may be combined with the controller circuit 416. In another physical embodiment, the components may be included as discrete components. Also, in another physical embodiment, each transmit antenna 114 may have its own transmit circuitry 206, rather than multiple transmit antennas 104a, 104b 104n sharing transmit circuitry 206 as illustrated in FIG. 4.

Figure 5:
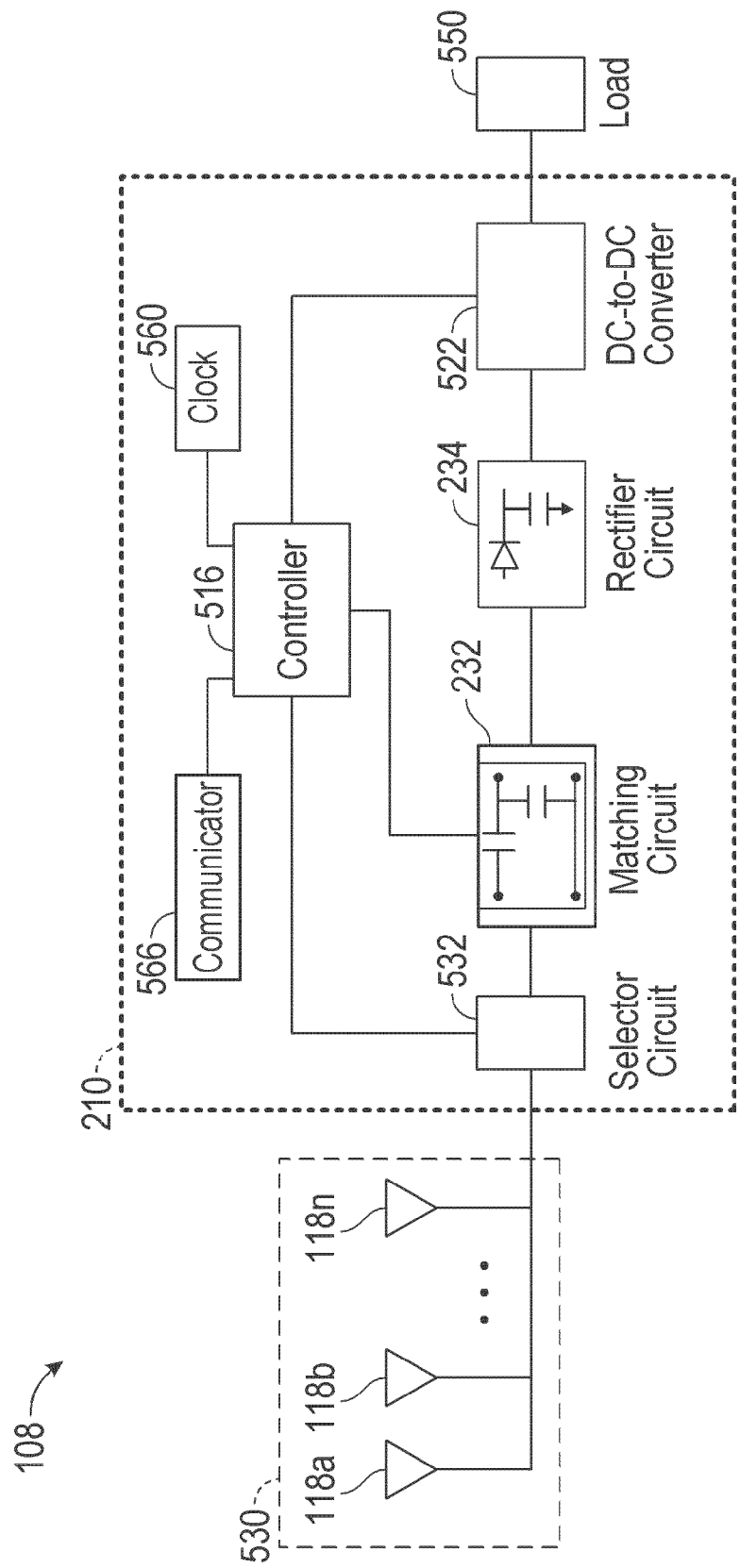
FIG. 5 is a functional block diagram of the receiver that may be used in the wireless power transfer system of FIG. 1, in accordance with another exemplary implementation.

FIG. 5 is a functional block diagram of the receiver 108 that may be used in the wireless power transfer system 100 of FIG. 1, in accordance with another exemplary implementation. As shown in the embodiment of FIG. 5, the receiver 108 may comprise a receiver pad 530. The receiver pad 530 may comprise at least one receive antenna 118a, 118b . . . 118n (e.g., a coil) where "n" designates an arbitrary number of receive antennas 118a, 118b . . . 118n, collectively hereinafter "118". The receive antennas 118 are configured to receive wireless power from the transmit antennas 114 (of FIG. 4). The receive antennas 118 are optionally configured to communicate with the transmit antennas 114. This communication may allow the receiver 108 to send information to the transmitter 104. Although only three receive antennas 118a, 118b, 118n are specifically illustrated, as will be described further below, the receiver 108 may comprise any number (one or greater) of receive antennas (as indicated with "114n") in accordance with different embodiments.

As described in connection to FIG. 2, the receiver 108 may comprise the receive circuitry 210. As shown in the embodiment of FIG. 5, the receive circuitry 210 may comprise a selector circuit 532 coupled to the outputs of the receive antennas 118. The selector circuit 532 is configured to receive the power output by the receive antennas 118. As will be discussed below, the selector circuit 532 is configured to be controlled by a controller circuit 516. The selector circuit 532 is configured to selectively activate (by connecting) or disable (by disconnecting) a particular receive antenna 118 from the receive circuitry 210. Disabling all of the receive antennas 118 may suspend charging of a load 550 such that the load receives no power from the receive antennas 118. Disabling less than all of the receive antennas 118 may suspend charging of the load 550 from the disabled receive antennas 118. The selector circuit 532 is configured to selectively activate or disable a particular receive antenna 118 receiving power from at least one transmit antenna 114 when the foreign object is detected within the charging area of the at least one transmit antenna 114. As will be discussed further below, the transmitter 104 can communicate the presence of the foreign object to the receiver 108 using any communication protocol.

The selector circuit 532 may also be configured to selectively activate or disable a particular receive antenna 118 when the presence detector circuit detects the particular receive antenna 118 within the charging area of a particular transmit antenna 114. For example, the selector circuit 532 may selectively activate the receive antenna 118a when the presence detector circuit 460 detects the receive antenna 118a within the charging area of the transmit antenna 114. Also, the selector circuit 532 may selectively disable the receive antenna 118a when the presence detector circuit 460 does not detect the receive antenna 118a within the charging area of the transmit antenna 114. As will be discussed further below, the presence detector circuit 460 may communicate the detection of the receive antenna 118a within the charging area of the transmit antenna 114 to the receiver 108 using any communication protocol. Thereby, by selectively activating and/or disabling a particular receive antenna 118 using the selector circuit 532, the receiver 108 may avoid damage to the receiver 108 due to the presence of a foreign object during the charging of the receive antenna 118. The selector circuit 532 may pass the power output by the activated receive antennas 118 to the matching circuit 232 to power or charge the load 550.

As described in connection to FIG. 2, the receive circuitry 210 may comprise the matching circuit 232. As shown in connection to the embodiment of FIG. 5, the matching circuit 232 may be coupled to the output of the selector circuit 532. The matching circuit 232 is configured to receive the output of the activated antennas 118. As described in connection to FIG. 2, the receive circuitry 210 may comprise the rectifier circuit 234 coupled to the matching circuit 232.

As shown in connection to the embodiment of FIG. 5, the receive circuitry 210 may comprise a DC-to-DC converter 522 coupled to the output of the rectifier circuit 234. The DC-to-DC converter 522 is configured to receive the direct current (DC) power signal from the output of the rectifier circuit 234. The DC-to-DC converter 522 may convert the direct current (DC) power signal into an energy potential (e.g., a voltage) that is compatible with the charging or power requirements of the load 550. The load 550 may be coupled to the output of the DC-to-DC converter 522 and be configured to receive the energy potential output by the DC-to-DC converter 522.

The receive circuitry 210 may comprise the controller circuit 516 coupled to the DC-to-DC converter 522, the matching circuit 232 and the selector circuit 532. The controller circuit is configured to control various components of the receive circuitry 210, including the DC-to-DC converter 522, the matching circuit 232 and the selector circuit 532. As discussed above, the controller circuit 516 is configured to control the selector circuit 532. The controller circuit 516 is configured to control the selector circuit 532 by sending control signals to the selector circuit 532. Thereby, based on the controller circuit's 516 control signals, the selector circuit 532 is configured to selectively activate (by connecting) or disable (by disconnecting) a particular receive antenna 118 from the receive circuitry 210.

The receive circuitry 210 may comprise a clock 560. The clock 560 may be coupled to the controller circuit 516 and is configured to communicate with the controller circuit 516. The controller circuit 516 is configured to control the clock 560. The clock is configured to generate a clock signal which enables the controller circuit 516 to synchronize actions performed by the controller circuit 516. In one embodiment, the controller circuit 516 may use the clock signal to synchronize the actions of the transmitter 104 and the receiver 108.

The receive circuit 210 may comprise a communicator circuit 566. The communicator circuit 566 may be coupled to the controller circuit 516. The controller circuit 516 is configured to control the communicator circuit 566. The communicator circuit 566 is configured to pass information to and from the controller circuit 516. The communicator circuit 566 is configured to enable communications between the controller circuit 516 and controller circuit 416 (of FIG. 4) by establishing a communication link with the communicator circuit 472 (of FIG. 4). The communication link may be implemented using any communication protocol. In certain embodiments, the communication link may be a conventional two-way communication protocol (e.g., a ultra-wideband radio communications protocol). Thereby, the controller circuit 416 can communicate the presence of the foreign object detected by the foreign object detector circuit 480 (of FIG. 4) to the controller circuit 516. Also, the controller circuit 416 can communicate the presence detector circuit's 460 detection of the receive antenna 118*a* within the charging area of the transmit antenna 114 (of FIG. 4) to the controller circuit 516.

As described in connection to FIG. 4, the receiver 108 may assist the transmitter 504 in detecting a foreign object within the charging area of the transmit antennas 114. To accomplish this, the controller circuit 516 may measure an initial amount of power the receiver 108 may be receiving from the transmitter 104 (e.g., the amount of power the receiver 108 acknowledges). The controller circuit 516 may take this power measurement at a first sample time, which the controller circuit 516 may determine based on the clock signals described above in connection with the clock 560. The controller circuit 516 may then take a second power measurement at a second sample time and determine a power difference value between the power measurements at each sample time. In one embodiment, if the receiver 108 receives a request from the transmitter 104, then the controller circuit 516 may send the power difference value to the controller circuit 416 via the communicator circuit 566 so that the controller circuit 416 may compare the power difference with a power difference independently generated by the controller circuit 416.

Although FIG. 5 shows many different components in functional block forms, an actual physical embodiment may combine one or more functional blocks in a single, unitary component. For example, the clock 560 or the selector circuit 532 may be combined with the controller circuit 516. In another physical embodiment, the components may be included as discrete components. Also, in another physical embodiment, each receive antenna 118 may have its own receive circuitry 210, rather than multiple receive antennas 118*a*, 118*b* 118*n* sharing receive circuitry 210 as illustrated in FIG. 5. In another physical embodiment, the receive circuitry 210 may comprise a foreign object detector circuit (not illustrated) that may be configured to communicate detection of the foreign object to the receive circuitry 206 or to the transmitter pad 420.

Figure 6:
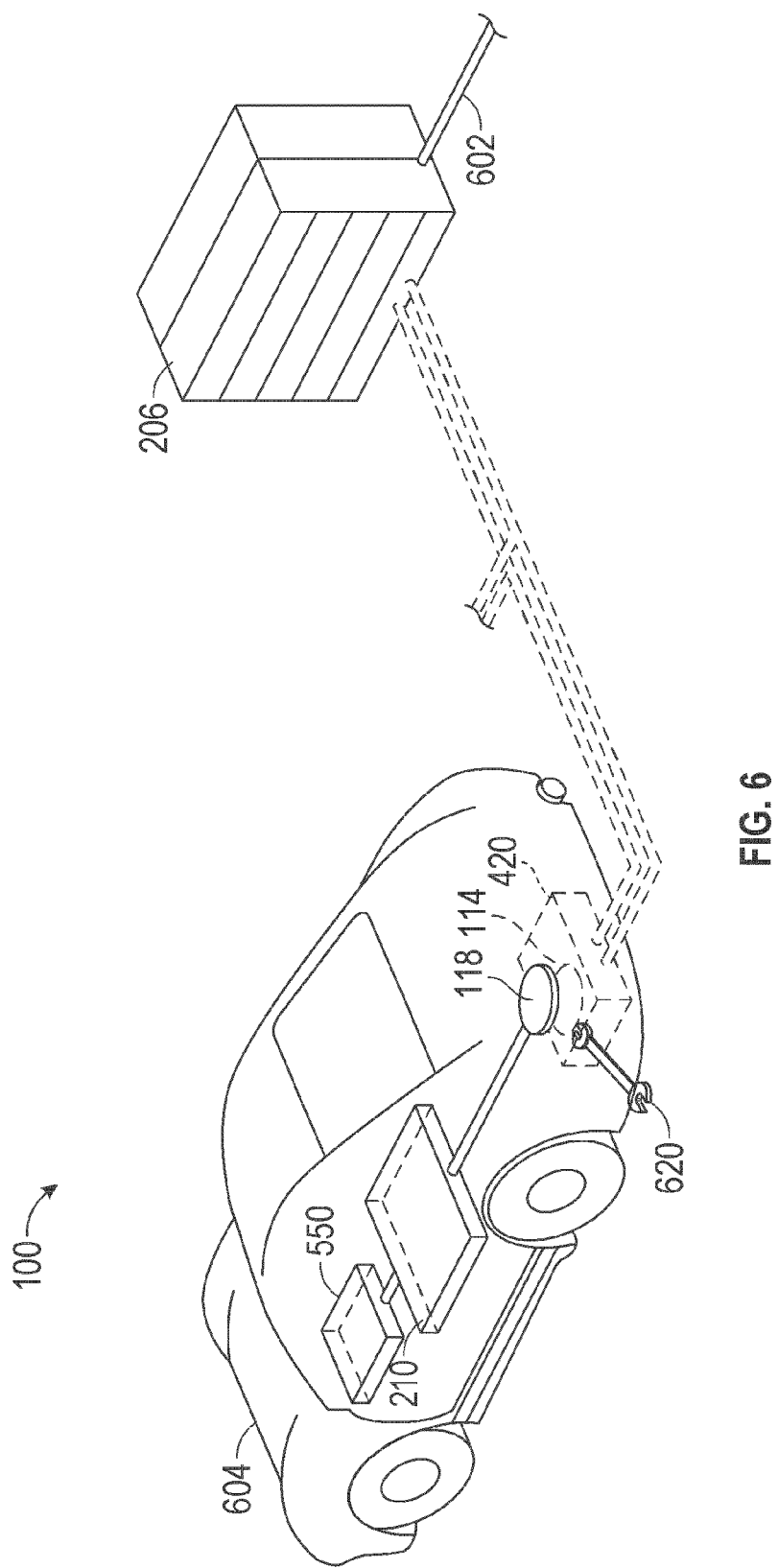
FIG. 6 is a diagram of an electric vehicle aligned over a transmitter pad in a wireless power transfer system, in accordance with an exemplary implementation.

FIG. 6 is a diagram of an electric vehicle 604 aligned over a transmitter pad 420 in a wireless power transfer system 100, in accordance with an exemplary implementation. The electric vehicle 604 (of FIG. 6) can be charged or powered in whole or in part using the wireless power transfer system 100 (of FIG. 1). As described in connection to FIG. 4, the transmit circuitry 206 may be part of the transmitter 104 (FIG. 1). As shown in the embodiment of FIG. 6, the transmit circuitry 206 may be coupled to a power backbone 602 (e.g., a power grid). The transmit circuitry 206 is configured to receive power from the power backbone 602. As described in connection to FIG. 4, the transmitter pad 420 may be coupled to the transmit circuitry 206 and be configured to receive power from the transmit circuitry 206. The transmitter pad 420 may comprise at least one transmit antenna 114 (e.g., a coil) coupled to the transmit circuitry 206. As shown in the embodiment of FIG. 6, the transmitter pad 420 may be located at or below the ground (as represented with dotted lines).

The electric vehicle 604 may be parked near the transmitter pad 420. The electric vehicle 604 may comprise the receive antenna 118 (e.g., a coil). As described in connection to FIG. 5, the receive antenna 118 may be part of the receiver pad 530, which may be part of the receiver 108. The receive antenna 118 may be positioned within the charging area of the transmit antenna 114 to receive power from the transmit antenna 114. As shown in the embodiment of FIG. 6, the electric vehicle 604 may comprise the receive circuitry 210 coupled to the output of the receive antenna 118. As described in connection to FIG. 5, the receive circuitry 210 is configured to receive power from the receive antenna 118. As shown in the embodiment of FIG. 6, the electric vehicle 604 may also comprise the load 550 (such as the electric vehicle battery 236 as described in connection to FIG. 2 or the electric vehicle engine) coupled to the output of the receive circuitry 210. The load 550 is configured to receive power from the receive circuitry 210. The receive circuitry 210 is configured to process the power received by the receive antenna 118 to power or charge the load 550.

The foreign object 620 is illustrated in the vicinity of the transmitter pad 420 and transmit antenna 114. The foreign object 620 may comprise any object not part of the wireless power transfer system 100 and/or not intended to be present during the charging process between the transmit antenna 114 and the receive antenna 118. For example, in an embodiment of the wireless power transfer system 100 implemented in a garage, the foreign object 620 may be a tool (e.g., a wrench, a hammer, etc.).

The foreign object 620 may present several problems for the wireless power transfer system 100. The foreign object 620 may interfere with the charging process by distorting the near field of the transmit antenna 114, decreasing the efficiency of the wireless power transfer system 100, or interrupting charging altogether. The foreign object 620 may absorb energy from the transmit antenna 114, presenting a heating or fire hazard to both the system 100 and to bystanders. Where the foreign object 620 is a metallic object (e.g., a wrench), these problems may be magnified, especially if the foreign object 620 is ferromagnetic.

Figure 7:
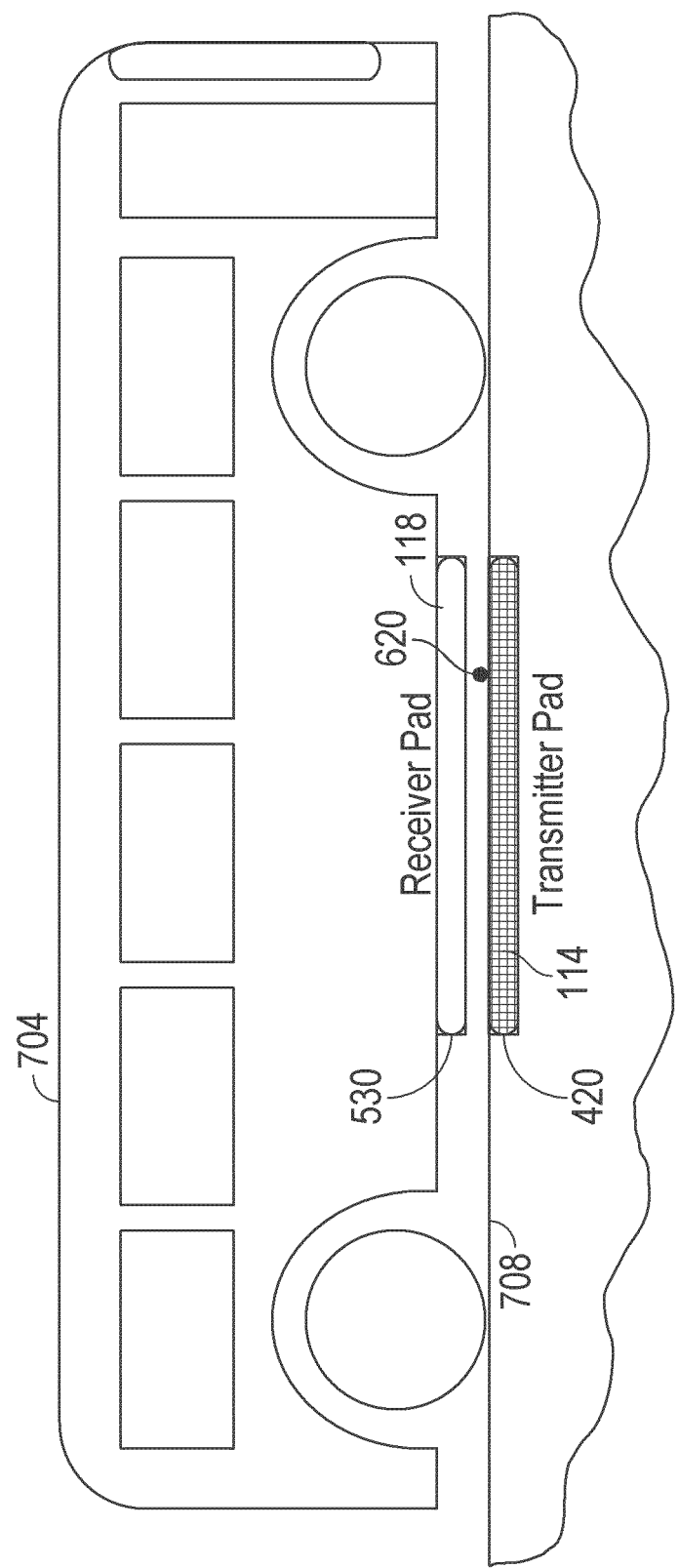
FIG. 7 is a side view of another electric vehicle aligned over the transmitter pad in the wireless power transfer system of FIG. 6, in accordance with another exemplary implementation.

FIG. 7 is a side view of another electric vehicle 704 aligned over the transmitter pad 420 in the wireless power transfer system 100 of FIG. 6, in accordance with another exemplary implementation. As shown in the embodiment of FIG. 7, the electric vehicle 704 comprises a different chassis than the electric vehicle 604 of FIG. 6. The transmitter pad 420 may be disposed across a surface 708. As described in connection to FIG. 4, the transmitter pad 420 may be part of the transmitter 104 and may comprise one transmit antenna 114 (e.g., a coil). As shown in the embodiment of FIG. 7, the electric vehicle 704 may be positioned above the transmitter pad 420.

The electric vehicle 604 may comprise the receiver pad 530. As described in connection to FIG. 5, the receiver pad 530 may be part of the receiver 108. The receiver pad 530 may comprise one receive antenna 118 (e.g., a coil). As shown in the embodiment of FIG. 7, the receiver pad 530 may be positioned along a lower surface of the electric vehicle 704. The receive antenna 118 may be positioned above and aligned with the transmit antenna 114 within the charging area of the transmit antenna 114. The transmit antenna 114 is configured to charge the electric vehicle 704 by wirelessly transferring power from the transmit antenna 114 to the receive antenna 118.

The foreign object 620 (of FIG. 6) may be located within the charging area of the transmit antenna 114 between the transmit antenna 114 and the receive antenna 118. As described in connection to FIG. 4, the foreign object detector circuit 480 is configured to detect the foreign object 620 within the charging area of the transmit antenna 114.

The selector circuit 430 is configured to disable the transmit antenna 114 when the foreign object detector circuit 480 detects the foreign object 620 within the charging area of the transmit antenna 114. Also, as described in connection to FIG. 5, the selector circuit 532 is configured to disable the receive antenna 118 when the foreign object detector circuit 480 detects the foreign object 620 within the charging area of the transmit antenna 114.

By using the selector circuit 532 to disable the receive antenna 118, the wireless power transfer system 100 may avoid damage to the transmit antenna 114, the receive antenna 118 and/or the foreign object 620. Specifically, this damage may be due to the foreign object 620 being located within the charging area of the transmit antenna 114. In this scenario, the electric vehicle 604 would no longer be charged.

Figure 8:
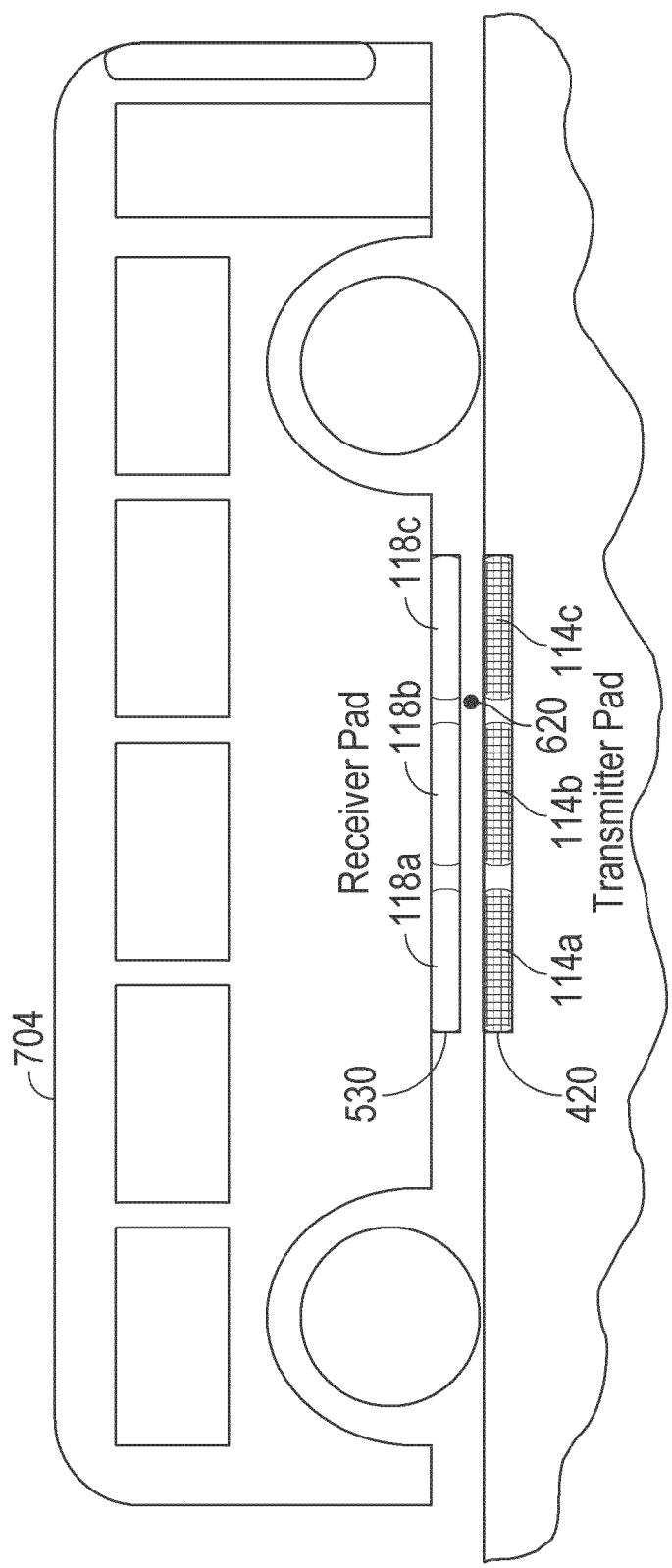
FIG. 8 is a side view of the electric vehicle of FIG. 7 comprising three transmit antennas, in accordance with another exemplary implementation.

FIG. 8 is a side view of the electric vehicle 704 of FIG. 7 comprising three transmit antennas 114, in accordance with another exemplary implementation. As described in connection to FIG. 4, the transmitter pad 420 may be part of the transmitter 104. As shown in the embodiment of FIG. 8, the transmitter pad 420 comprises three transmit antennas 114*a*, 114*b*, 114*c*. Also, the electric vehicle 704 comprises the receiver pad 530 comprising three receive antennas 118*a*, 118*b*, 118*c*. As described in connection to FIG. 4, the receiver pad 530 may be part of the receiver 108.

As shown in the embodiment of FIG. 8, the foreign object 620 (of FIG. 6) may be located within the charging area of the transmit antenna 114*c*. As described in connection to FIG. 4, the foreign object detector circuit 480 is configured to detect the foreign object 620 located within the charging area of the transmit antenna 114*c*. The selector circuit 430 is configured to disable the transmit antenna 114*c* when the foreign object detector circuit 480 detects the foreign object 620 within the charging area of the transmit antenna 114*c*. As described in connection to FIG. 5, the selector circuit 532 is configured to disable the receive antenna 118*c* when the foreign object detector circuit 480 detects the foreign object 620 within the charging area of the transmit antenna 114*c*. Furthermore, the selector circuit 532 is configured to maintain activation of transmit antennas 114*a* and/or 114*b* while the foreign object is present in the charging area of the transmit antenna 114*c*.

Figure 9:
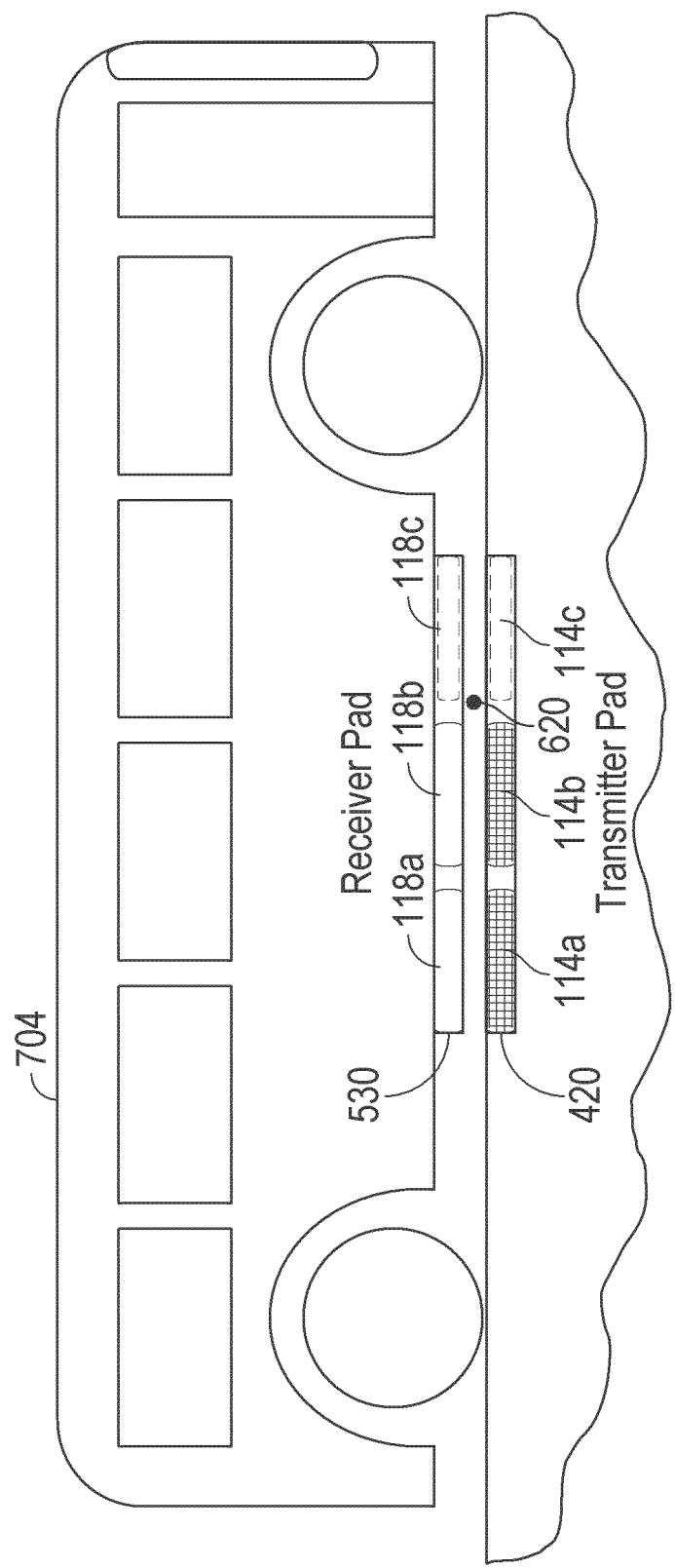
FIG. 9 is a side view of the transmitter pad of FIG. 8 with one of the transmit antennas disabled, in accordance with another exemplary implementation.

FIG. 9 is a side view of the transmitter pad 420 of FIG. 8 with transmit antennas 114*c* disabled, in accordance with another exemplary implementation. As described in connection to FIG. 8, the foreign object 620 may be located within the charging area of the transmit antenna 114*c*. As shown, transmit antennas 114*a* and 114*b* are activated while transmit antenna 114*c* is disabled.

As shown in the embodiment of FIG. 9, the selector circuit 430 disables the transmit antenna 114*c* and the selector circuit 532 disables the receive antenna 118*c*. As described in connection to FIG. 4, the transmit antenna 114*c* may be disabled due to the foreign object detector circuit's 480 detection of the foreign object 620 within the charging area of the transmit antenna 114*c*. Also, as described in connection to FIG. 5, the selector circuit 532 may or may not disable the receive antenna 118*c*. The receive antenna 118*c* may be disabled due to the foreign object detector circuit's 480 detection of the foreign object 620 within the charging area of the transmit antenna 114*c*. Accordingly, damage to the wireless power transfer system 100 (of FIG. 6) due to the presence of a foreign object 620 within the charging area of the transmit antenna 114*c* during the charging of the receive antenna 118*c* may be avoided. While in some embodiments the transmit antennas 114 transfer less collective power when transmit antenna 114*c* is disabled, in other embodiments, the controller 416 (FIG. 4) may be configured to increase an amount of power transmitted by transmit antennas 114*a* and 114*b* such that the same amount of power is transmitted. Also, power intensive loads (such as for a bus)

may be more easily transmitted with a plurality of transmit antennas 114 than with a single transmit antenna 114. Furthermore, although only three transmit antennas 114*a*, 114*b*, 114*c* are specifically illustrated in FIGS. 8 and 9, the transmitter pad 420 may comprise any number (one or greater) of transmit antennas 114 in accordance with different embodiments.

Figure 10:
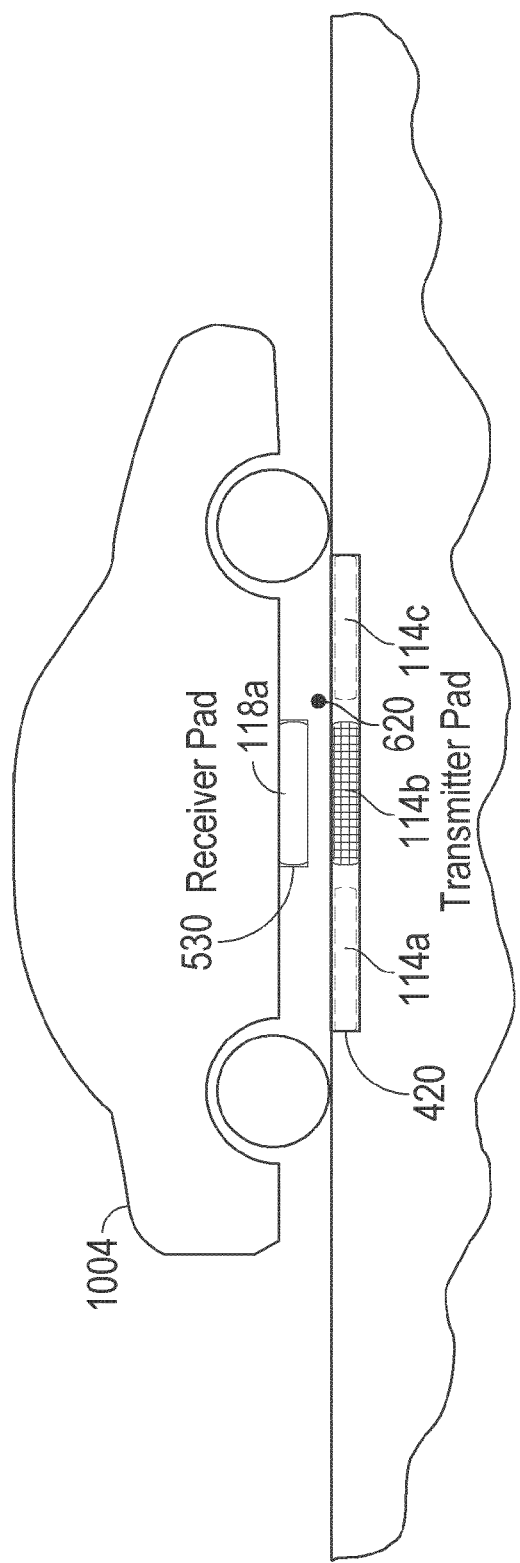
FIG. 10 is a side view of a small electric vehicle aligned over the transmitter pad in the wireless power transfer system of FIG. 6, in accordance with another exemplary implementation.

FIG. 10 is a side view of a small electric vehicle 1004 aligned over the transmitter pad 420 in the wireless power transfer system of FIG. 8, in accordance with another exemplary implementation. As described in connection to FIG. 8, the transmitter pad 420 may comprise three transmit antennas 114*a*, 114*b*, 114*c*.

As shown in the embodiment of FIG. 10, the small electric vehicle 1004 comprises the receiver pad 530 comprising one receive antenna 118*a*. The receive antenna 118*a* is located above the transmit antenna 114*b* and within the charging area of the transmit antenna 114*b*. As described in connection to FIG. 4, the presence detector circuit 460 is configured to detect the presence of the receive antenna 118*a* within the charging area of the transmit antennas 114. The selector circuit 430 is configured to activate the transmit antenna 114*b* when the presence detector circuit 460 detects the receive antenna 118*a* within the charging area of the transmit antenna 114*b*. As described in connection to FIG. 5, the selector circuit 532 is configured to activate the receive antenna 118*a* when the presence detector circuit 460 detects the receive antenna 118 within the charging area of the transmit antenna 114. As shown in the embodiment of FIG. 10, only the transmit antenna 114*b* and the receive antenna 118*a* are activated.

Thereby, the wireless power transfer system 100 may be able to use the same transmitter pad 420 for differently sized electric vehicles (such as the small electric vehicle 1004 of FIG. 10 and the electric vehicle 704 of FIG. 7). Also, the wireless power transfer system 100 dynamically activates the transmit antennas 114 dependent upon the presence detector circuit 460 detecting the receive antenna 118 within the charging area of transmit antennas 114. In addition, as described above, a foreign object detection circuit 480 may detect a foreign object in a charging area of transmit antenna 114*c* which may cause the selector circuit 430 (FIG. 4) to disable the transmit antenna 114*c*. In some embodiments, a user of the small electric vehicle 1004 may be notified via the controller 416 (FIG. 4) as to the transmit antenna 114*c* that is disabled. As such the user may position the small electric vehicle 1004 to receive power from one of the transmit antennas 114*a* or 114*b* that do not have foreign objects located in their charging areas. In this way, the transmitter pad 420 may charge a small electric vehicle 1004 even when a foreign object is detected in a portion of the entire charging region.

Figure 11:
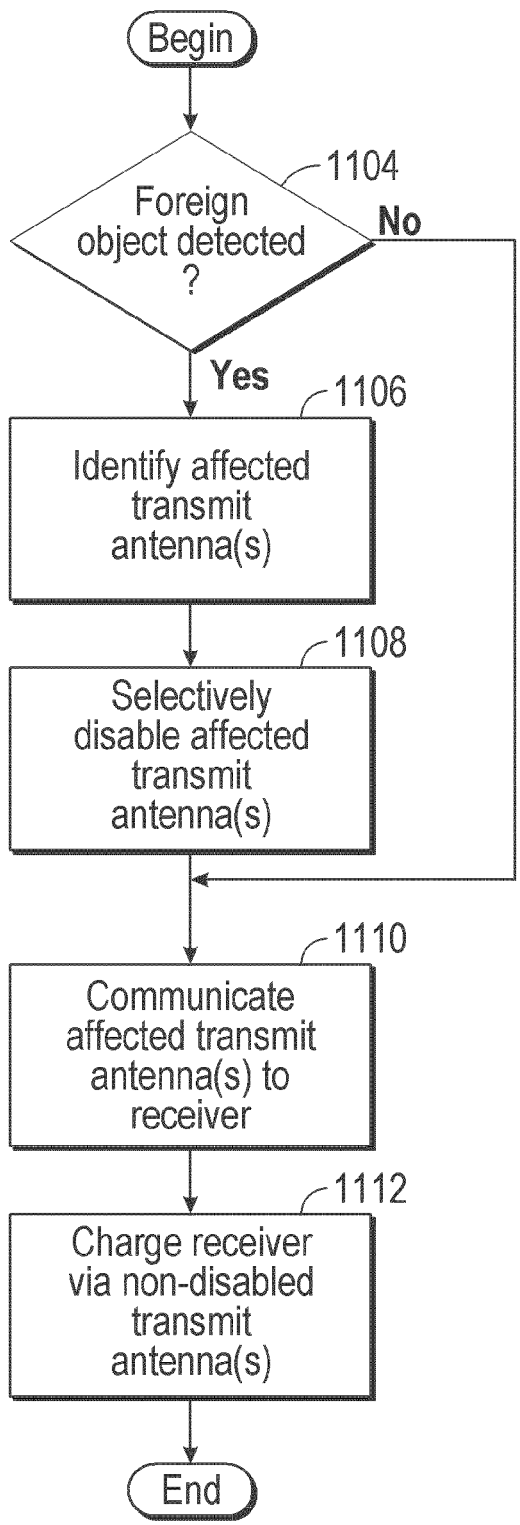
FIG. 11 illustrates a flowchart depicting a method of disabling the transmit antennas of FIG. 4 when the foreign object is detected within the charging area of the transmit antennas, in accordance with an exemplary implementation.

FIG. 11 illustrates a flowchart depicting a method of disabling the transmit antennas 114 of FIG. 4 when the foreign object 620 (of FIG. 6) is detected within the charging area of the transmit antennas 114, in accordance with an exemplary implementation. As described in connection to FIG. 4, the controller circuit 416 may disable a particular transmit antenna 114 when the foreign object 620 is detected within the charging area of the particular transmit antennas 114. Although the process in FIG. 11 is illustrated in a particular order, in certain embodiments the blocks herein may be performed in a different order, or omitted, and additional blocks can be added. The process of the illustrated embodiment may be implemented in any controller circuit 416 or foreign object detector circuit 480 (of FIG. 4) in order to disable a particular transmit antenna 114 when the foreign object 620 is detected within the charging area of the particular transmit antenna 114.

At block 1104, the foreign object detector circuit 480 may determine whether the foreign object 620 is detected within a charging area of a particular transmit antenna 114. As shown in the embodiment of FIG. 11, if the foreign object 620 is detected within a charging area of a particular transmit antenna 114, the method proceeds to block 1106. If the foreign object 620 is not detected within a charging area of a particular transmit antenna 114, the method proceeds to block 1110.

At block 1106, the controller circuit 416 may identify which transmit antenna(s) 114 is/are affected by having the foreign object 620 within the charging area of the affected transmit antenna(s) 114. At block 1108, the controller circuit 416 may selectively disable the transmit antenna(s) 114 affected by having the foreign object 620 within the charging area of the affected transmit antenna(s) 114. At block 1110, the controller circuit 416 may (optionally) indicate what the affected transmit antenna(s) 114 is/are to the receiver 108 (of FIG. 5). At block 1112, the controller circuit 416 may activate the non-disabled transmit antenna(s) 114 to charge the receiver 108

Figure 12:
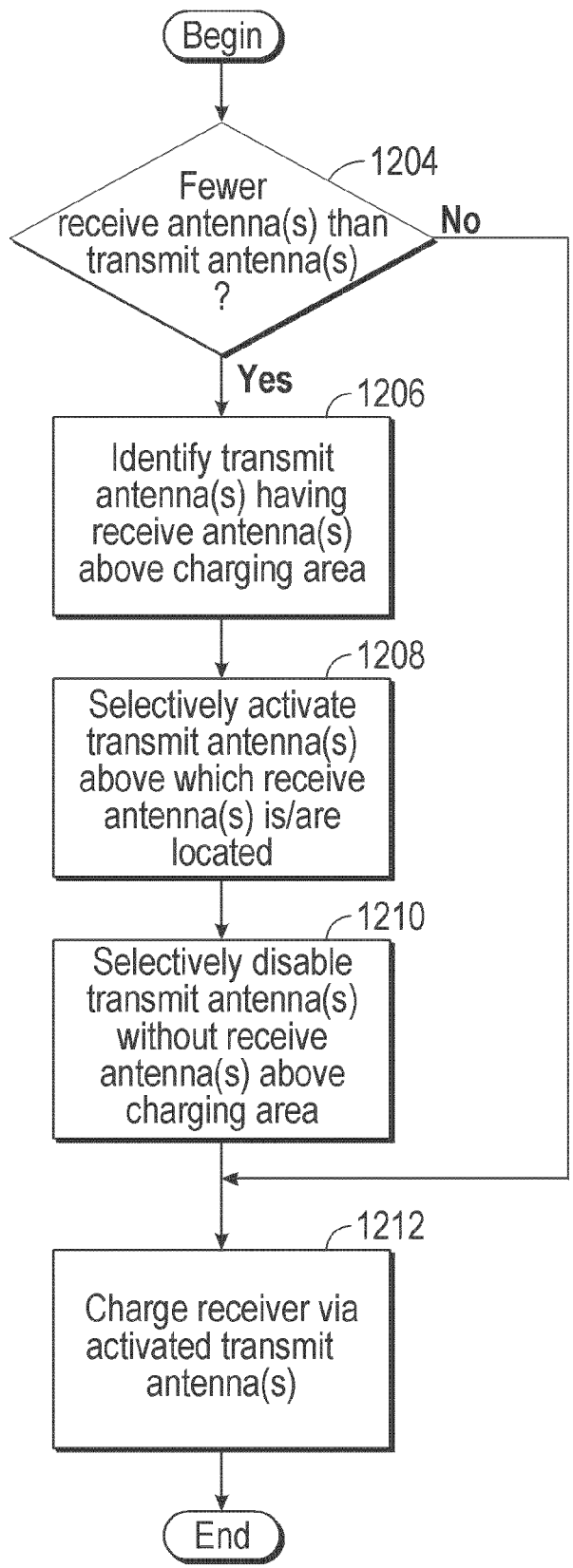
FIG. 12 illustrates a flowchart depicting a method of activating or disabling a particular transmit antenna of FIG. 4 based upon whether the receive antenna is detected within the charging area of the particular transmit antennas, in accordance with an exemplary implementation.

FIG. 12 illustrates a flowchart depicting a method of activating or disabling a particular transmit antenna 114 of FIG. 4 based upon whether the receive antenna 118 is detected within the charging area of the particular transmit antennas 114, in accordance with an exemplary implementation. As described in connection to FIG. 4, the controller circuit 416 may activate or disable a particular transmit antenna 114 based upon the presence detector circuit 460 detecting the presence of the receive antenna 118 within the charging area of the particular transmit antenna 114. Although the process in FIG. 12 is illustrated in a particular order, in certain embodiments the blocks herein may be performed in a different order, or omitted, and additional blocks can be added. The process of the illustrated embodiment may be implemented in any controller circuit 416 in order to activate or disable a particular transmit antenna 114 based upon the presence detector circuit 460 detecting the presence of the receive antenna 118 within the charging area of the particular transmit antenna 114.

At block 1204, the controller circuit 416 may make a determination as to whether there are fewer receive antenna(s) 118 than transmit antenna(s) 114. As discussed in FIG. 4, the controller circuit 416 may communicate with the receiver 108. The communication may include information used to make the determination as to whether there are fewer receive antenna(s) 114 than transmit antenna(s) 118. If there are fewer receive antenna(s) 114 than transmit antenna(s) 118, the method proceeds to block 1206. If there are not fewer receive antenna(s) 114 than transmit antenna(s) 118, the method proceeds to block 1212.

At block 1206, the controller circuit 416 may identify a transmit antenna(s) 114 having receive antenna(s) 118 above the charging areas of the transmit antenna(s) 114. At block 1208, the controller circuit 416 may selectively activate the transmit antenna(s) above which receive antenna(s) is/are located. At block 1210, the controller circuit 416 may selectively disable a transmit antenna(s) without receive antenna(s) 118 above the charging areas of the transmit antenna(s) 114. At block 1212, the controller circuit 416 may charge the receiver 108 using the activated transmit antenna(s) 114.

It will be understood that the appropriate circuits may be used in alternative embodiments depending on the circumstances in which the respective wireless power transfer system is expected to operate. Furthermore, the disclosure is not limited to any particular receiver-side means of generating a current in the receiver inductor and the voltage transformer, current transformer, and reversible rectifier techniques are discussed herein by way of example only.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As examples, some electric vehicles may be hybrid electric vehicles that include a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (for example, electronic devices such as personal computing devices and the like).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for charging an electric vehicle may comprise the transmit antenna 114 and means for disabling and means for maintaining activation may comprise the controller circuit 516.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power transfer system, comprising:
  a plurality of transmit antennas configured to transmit power to one or more receive antennas of an electric vehicle positioned over a charging region, comprising;
    a first transmit antenna configured to charge the electric vehicle positioned over the charging region, the first transmit antenna configured to charge the electric vehicle via a first area of the charging region; and
    a second transmit antenna configured to charge the electric vehicle positioned over the charging region, the second transmit antenna configured to charge the electric vehicle via a second area of the charging region different than the first area of the charging region;

a controller circuit coupled to the plurality of transmit antennas, the controller circuit configured to selectively:
disable the first transmit antenna when a foreign object is detected in a first space that affects charging via the first area of the charging region;
maintain activation of the second transmit antenna while the electric vehicle is positioned to receive power from the second transmit antenna via the second area when the foreign object is detected in the first space; and
disable at least one of the plurality of transmit antennas when a total number of the plurality of transmit antennas is greater than a total number of the one or more receive antennas of the electric vehicle.

2. The wireless power transfer system of claim 1, further comprising at least one foreign object detector circuit configured to detect the foreign object as being positioned in the first space or in a second space that affects charging via the second area.

3. The wireless power transfer system of claim 1, wherein the controller circuit is further configured to selectively activate the first transmit antenna when the foreign object is not detected in the first space.

4. The wireless power transfer system of claim 1, wherein the plurality of transmit antennas is further configured to transmit less power when the first transmit antenna is disabled relative to when the first transmit antenna is not disabled.

5. The wireless power transfer system of claim 1, wherein the plurality of transmit antennas is further configured to transmit a same amount of power when the first transmit antenna is disabled relative to when the first transmit antenna is not disabled.

6. The wireless power transfer system of claim 1, further comprising a presence detector circuit coupled to the controller circuit,
wherein the first transmit antenna is further configured to transmit power to at least one of the one or more receive antennas, and the second transmit antenna is further configured to transmit power to at least one of the one or more receive antennas,
wherein the presence detector circuit is configured to detect when at least one of the one or more receive antennas is positioned over the first transmit antenna and when at least one of the one or more receive antennas is positioned over the second transmit antenna, and
wherein the controller circuit is further configured to selectively disable the first transmit antenna when at least one of the one or more receive antennas is not positioned over the first transmit antenna and to selectively activate the second transmit antenna when at least one of the one or more receive antennas is positioned over the second transmit antenna.

7. The wireless power transfer system of claim 6, further comprising a communicator circuit coupled to the controller circuit, wherein the communicator circuit is configured to indicate to the electric vehicle that the first transmit antenna is disabled.

8. The wireless power transfer system of claim 6, wherein the controller circuit is further configured to selectively disable the second transmit antenna when at least one of the one or more receive antennas is not positioned over the second transmit antenna.

9. The wireless power transfer system of claim 1, further comprising a selector circuit coupled to the controller circuit, the first transmit antenna and the second transmit antenna, wherein the selector circuit comprises a switch configured to receive an instruction signal from the controller circuit to selectively disable the first transmit antenna and selectively activate the second transmit antenna.

10. The wireless power transfer system of claim 1, further comprising a transmit circuit comprising the first transmit antenna and the second transmit antenna, wherein the transmit circuit is configured to provide power at a level sufficient to charge or power the electric vehicle.

11. A method of wireless power transfer, comprising:
charging an electric vehicle positioned over a charging region via a first area of the charging region;
charging the electric vehicle positioned over the charging region via a second area of the charging region that is different than the first area;
disabling the charging via the first area when a foreign object is detected in a first space that affects the charging via the first area;
maintaining the charging via the second area while the electric vehicle is positioned to receive power from the charging via the second area when the foreign object is detected in the first space; and
selectively disabling a first transmit antenna of a plurality of transmit antennas when a total number of the plurality of transmit antennas is greater than a total number of one or more receive antennas of the electric vehicle.

12. The method of claim 11, further comprising:
detecting the foreign object as being in the first space or in a second space that affects charging via the second area.

13. The method of claim 11, further comprising:
selectively activating a first antenna for charging via the first area when the foreign object is not detected in the first space.

14. The method of claim 11, further comprising:
indicating to the electric vehicle that the first transmit antenna is disabled; and
selectively disabling a second transmit antenna of the plurality of transmit antennas when a receive antenna of the one or more receive antennas is not positioned over the second transmit antenna.

15. An apparatus for wirelessly transferring power, comprising:
a plurality of means for charging an electric vehicle positioned over a charging region by transmitting power to one or more receiving means of the electric vehicle, comprising:
first means for charging the electric vehicle positioned over the charging region via a first area of the charging region; and
second means for charging the electric vehicle via a second area of the charging region different than the first area of the charging region;
means for disabling the first means when a foreign object is detected in a first space that affects charging via the first area;
means for maintaining activation of the second means while the electric vehicle is positioned to receive power from the second means when the foreign object is detected in the first space; and
means for disabling at least one of the plurality of charging means when a total number of the plurality of char means is greater than a total number of the one or more receiving means of the electric vehicle.

16. The apparatus of claim 15, further comprising:
means for detecting the foreign object as being in the first space or in a second space that affects charging via the second area.

17. The apparatus of claim 15, further comprising:
means for selectively activating the first means when the foreign object is not detected in the first space.

18. The apparatus of claim 15, wherein the first means for charging comprises a first transmit antenna, the second means for charging comprises a second transmit antenna, the means for disabling comprises a controller circuit, and the means for maintaining activation also comprises the controller circuit.

19. A wireless power transfer system, comprising:
a plurality of transmit antennas configured to transmit power to one or more receive antennas of an electric vehicle positioned over a charging region;
a controller circuit coupled to the plurality of transmit antennas, the controller circuit configured to selectively disable at least one of the plurality of transmit antennas when a total number of the plurality of transmit antennas is greater than a total number of the one or more receive antennas of the electric vehicle.

20. The wireless power transfer system of claim 19, wherein the plurality of transmit antennas comprises at least:
a first transmit antenna configured to charge the electric vehicle positioned over the charging region, the first transmit antenna configured to charge the electric vehicle via a first area of the charging region; and
a second transmit antenna configured to charge the electric vehicle positioned over the charging region, the second transmit antenna configured to charge the electric vehicle via a second area of the charging region different than the first area of the charging region.

21. The wireless power transfer system of claim 20, wherein the controller circuit is further configured to selectively:
disable the first transmit antenna when a foreign object is detected in a first space that affects charging via the first area of the charging region; and
maintain activation of the second transmit antenna while the electric vehicle is positioned to receive power from the second transmit antenna via the second area when the foreign object is detected in the first space.

22. The wireless power transfer system of claim 20, further comprising at least one foreign object detector circuit configured to detect the foreign object as being positioned in the first space or in a second space that affects charging via the second area.

23. The wireless power transfer system of claim 20, further comprising a presence detector circuit coupled to the controller circuit,
wherein the first transmit antenna is further configured to transmit power to at least one of the one or more receive antennas, and the second transmit antenna is further configured to transmit power to at least one of the one or more receive antennas,
wherein the presence detector circuit is configured to detect when at least one of the one or more receive antennas is positioned over the first transmit antenna and when at least one of the one or more receive antennas is positioned over the second transmit antenna, and
wherein the controller circuit is further configured to selectively disable the first transmit antenna when at least one of the one or more receive antennas is not positioned over the first transmit antenna and to selectively activate the second transmit antenna when at least one of the one or more receive antennas is positioned over the second transmit antenna.

24. The wireless power transfer system of claim 20, further comprising a selector circuit coupled to the controller circuit, the first transmit antenna and the second transmit antenna, wherein the selector circuit comprises a switch configured to receive an instruction signal from the controller circuit to selectively disable the first transmit antenna and selectively activate the second transmit antenna.

25. The wireless power transfer system of claim 20, further comprising a transmit circuit comprising the first transmit antenna and the second transmit antenna, wherein the transmit circuit is configured to provide power at a level sufficient to charge or power the electric vehicle.

* * * * *